United States Patent Office 3,647,704
Patented Mar. 7, 1972

3,647,704
PREMIXED ELASTOMERIC COMPOUNDING
COMPOSITION AND PROCESS
William J. Schrantz, Jr., Louisville, Ky., assignor to
International Rubber Industries, Inc., Louisville, Ky.
No Drawing. Filed Mar. 28, 1969, Ser. No. 817,171
Int. Cl. C08c 11/02; C08d 13/28
U.S. Cl. 252—182                                    11 Claims

ABSTRACT OF THE DISCLOSURE

A premixed elastomeric compounding composition having extended shelf-life and rapid cure characteristics and comprising, in synergistic combination, zinc oxide, sulfur, zinc oxide-fatty acid reaction product, and accelerators. The compounding composition is a mixture of granulated bound-together material of uniform composition which resists stratification into individual components.

---

This invention relates to the art of elastomer compounding and vulcanization and, more particularly, to stable premixed rubber curing compositions, a process for making the same and the compounded curable material produced thereby.

Although the basic emphasis of this invention is specifically directed towards the tire retread industry, it should be understood that this invention has general application to process industries which manufacture vulcanized articles.

A tire retread processor generally purchases, from commercial sources, vulcanizable masterbatch rubber in bale or strip form. Before a finished vulcanized tire tread can be produced, an intermediate processing or compounding operation is performed on masterbatch rubber to produce an intermediate product or masticated rubber blended with curing agents and other additives. The compounded rubber may be temporarily stored or immediately processed to the finished form.

Conventionally, intermediate rubber compounded products have been prepared on a two-roll mill or in a Banbury mixer by slowly adding and blending each of the curing agents, etc., separately, into the rubber being masticated, or where a mill is used, along the banded portion on the roll. If complete dispersion is not obtained, the physical properties of the final product will be adversely affected. However, if mastication is prolonged, again, the degradation of the stock is inevitable. As will be generally appreciated, the separate addition of each of the ingredients to the masticating rubber is time-consuming, and undesirable from a quality viewpoint. A typically processed masterbatch rubber will include curing agents, accelerators, accelerator-activators, sulfur, and may also include miscellaneous binders, softeners, fillers, anti-oxidants, etc. Since each additive requires separate weighing and blending operations, the chances for obtaining a quality product increasingly diminish.

It should therefore be evident that a complete premixed compounding composition provides a novel approach for processing rubber masterbatch materials into an intermediate product ready to be vulcanized to a final article which enjoys a concomitant lower cost and improved quality over articles made using conventional techniques. Prior to this invention, it was generally believed that the premixing of compounding ingredients, while desirable from an economc viewpoint, could not be accomplished due to a susceptibility of the ingredients to continuously interact with each other on standing prior to incorporation into a masterbatch rubber. It was felt that such a product behaved unpredictably and therefore was less effective and undesirable as a rubber compounding composition.

This invention not only demonstrates that premixed compounding compositions can be successfully produced, but that such a composition offers greater stability and predictability than prior art compositions.

It is therefore a primary object of the present invention to provide a premixed compounding composition for incorporation in curable elastomers having stability and predictability and which negates those difficulties experienced in using conventional compounding techniques heretofore mentioned.

Another object of the present invention is to provide a premixed compounding composition which is capable of retaining its outstanding curing characteristcs and physical homogeneity over prolonged periods in storage, at elevated temperatures.

Still another object of the present invention is to provide a premixed compounding composition which is readily dispersible in a masterbatch masticated rubber wherein said premixed composition includes all of the ingredients necessary for vulcanizing said rubber.

A further object of this invention is to provide a premixed compounding composition adapted for use with curable rubber masterbatch material wherein said composition is economical to use and is effective in producing a quality vulcanized article.

Yet another object of this invention is to provide a novel process for the manufacture of the premixed compounding composition, as aforesaid, for achieving the above-stated objectives.

Yet another object of the present invention is to provide a readily curable elastomeric article with improved physical properties comprising a uniform dispersion of a premixed curing composition therein.

These and still further objects of the present invention will become readily apparent to one skilled in the art from the following detailed description and specific examples.

Broadly, the composition of the present invention comprises a homogeneous mixture of compounding ingredients in amounts, by weight, of up to about 60% zinc oxide, from about 20% to about 40% sulfur, from about 5% to about 50% of a zinc oxide-fatty acid reaction product, as for example, zinc stearate, and a combined weight of up to about 15% of accelerator and an accelerator-activator.

Although the precise mechanism of rubber vulcanization has yet to be unraveled, it is generally recognized that zinc oxide plays an important role in promoting sulfur cross-linking, or "vulcanization" of the rubber molecules. Stearic acid is generally added to a masterbatch material as a softening agent or plasticizer. Thus, zinc oxide and stearic acid, as such, are typically separately added and therefore included in an intermediate compounded rubber prior to vulcanization for the above reasons. However, it was unexpectedly found that when zinc oxide and stearic acid are reacted in situ, in the presence of sulfur, and accelerators such as benzylthiazyl disulfide, tetramethyl thiuram monosulfide, and an accelerator-activator such as urea, under controlled conditions as will be described in greater detail hereinafter, a synergistic composition is obtainable with significantly improved compounding and curing efficacy than when the same unreacted components are added separately as compounding ingredients to a masticating rubber. This effect is believed directly attributable to the formation of reaction products which are stable and can immediately participate in the final vulcanization reaction without undergoing significant, additional transformation during vulcanization. This is evidenced by the formation of a zinc salt of a fatty acid, e.g. zinc stearate, prior to the compounding and vulcanization procedures. By combining zinc oxide and fatty acids, in the presence of sulfur, under controlled conditions, a stable compounding composition is formed, capable of being stored for extended periods, at elevated temperatures, e.g. nine months at 100° F., without appreciable physical or chemical degradation. Comparative tests showing the physical properties of vulcanized rubber were conducted on specimens made with the composition of the present invention, as opposed to specimens made with separately added components, using identical rubber masterbatch material. The results are tabulated in Example 2. Significantly, the optimum curing time for specimens incorporating the premixed composition was considerably shorter than conventionally processed specimens, i.e. from 13% to 35% shorter, depending on the particular masterbatch rubber used. In addition to reducing vulcanizing time, the physical properties of the rubber were considerably improved.

Not to be overlooked is the additional time-saving factor in the compounding operation resulting from the use of a premixed composition. For example, a 90 pound batch of uncured rubber masterbatch material, which conventionally requires 30 minutes to compound, can be done in 15 minutes, using the composition of the present invention. Therefore, the productivity of a two-roll mill operator may be doubled, i.e. from 8 batches per shift to 16 batches. In view of the highly competitive nature of the tire retread industry, such cost reductions are significant. Considering the immense quantities of rubber retread material used in this country, which is estimated at more than 700,000,000 pounds per year, the total industry savings is outstanding, such savings generally being passed on to the consuming public.

In preparing the premixed compounding composition of the present invention, the process broadly comprises the steps of weighing the curing agent components, adding said components to a tumbling-type mixer, tumbling the particles, adding a fatty acid component, as for example, stearic acid, to said powders, reacting the mixture in situ, cooling the resultant composition and packaging the same.

A typical batch is processed as follows:

First, dry granular curing additives are individually weighed and charged into a high intensity rotatable liquid-solids blender with jacketed heating means. One such suitable mixer is manufactured by Patterson-Kelley Corporation, East Stroudsburg, Pa., designated as Twin-Shell Mixer with Intensifier Bar. No particular criticality is attributable to the sequence of charging; the following ingredients being added to said mixer prior to the introduction of fatty acid, in the proportions given, by weight.

| Ingredient | Permissible range | Preferred range |
| --- | --- | --- |
| Zinc oxide, percent | 35-60 | 38-44 |
| Sulfur, percent | 20-40 | 28-34 |
| Accelerators, percent | 0-12 | 9-11 |
| Accelerator-activator, percent | 0-3 | 0.5-2 |

The above mixture is blended, and heated by the jacketed shell maintained at a temperature of between 132° F.–140° F. An appropriate quantity of rubber grade stearic acid, in a molten state, is then added to the preheated blended powders which, when combined with the powder, comprises from about 5% to 35%, and preferably from 10% to 20%, of the weight of the combined mixture. The molten stearic acid, under pressure, is fed through a heated conduit and introduced directly into a rotating liquid feed tube intensifier bar positioned within the mixer shell, said bar being provided with radially projecting openings along the longitudinal axis thereof for creating a spray or atomization of the liquid as it enters the mixer. The stearic acid contacts the powder and reacts therewith.

The rate of stearic acid addition may vary but is generally completed within five minutes and preferably from two to four minutes. After the stearic acid is added, the resultant composition is then further mixed, as by tumbling, to provide a substantial intermixing of all the ingredients present therein. The temperature of the molten stearic acid, when introduced, is critical. For example, it was found that when the temperature of the molten stearic acid exceeded 185° F., the resultant composition solidified to an unuseable, hard concrete-like mass. Preferably, this temperature may range from 165° F. to 185° F. On the other hand, if the temperature of the stearic acid is too low, the resultant reaction rate will be considerably diminished and the time required for mixing would be excessive.

It has also been found that where the temperature of the mixed powders immediately prior to the introduction of molten stearic acid is too low, a hard-to-remove, self-adhering product is formed, having slower curing properties than the preferred product. The powders are therefore preferably heated, by conventional means, to a temperature above room temperature such that the product formed is dry, free-flowing and effective. A more preferred average temperature range for the mixed powders prior to the introduction of the molten fatty acid is from about 110° F. to about 140° F.

After the stearic acid has been added, and the ingredients reacted, the resulting composition reaches a temperature ranging from about 185° F. to about 200° F. whereupon the composition is then cooled to room temperature by discharging through a water-cooled heat exchanger. Alternatively, proper cooling may be effected by spreading the hot mixture in thin layers on to an extended surface for air-cooling. It is to be noted that proper cooling, as indicated above, is required in order to dissipate the heat generated within the composition mass, e.g. sensible heat and heat of reaction, thereby preventing localized overheating or "hot spotting" with accompanying damage to the composition. Once cooled, the reaction is abated and the composition is packaged in suitable containers for storage or for use in a rubber masticating mill or mixer.

Upon inspection of the compounding product, it is readily observable to be a dry, homogenous mixture of relatively fine agglomerated particles, each of said agglomerates having a substantially identical composition to the other particles and possessing outstanding properties such as stability and long-shelf life, fast cure, and resistance to stratification when subjected to prolonged shaking. The non-stratifying quality is of considerable importance to a rubber processor who must rely on the accuracy of the weighing and the homogeneity of the composition to obtain the quality product demanded by the purchaser. The premixed composition of this invention satisfied all of these requirements thereby overcoming the large variances in particle size and bulk densities of the starting materials used in the process.

As to the ingredients used in the practice of this invention, the zinc oxide component is preferably added in proportions from about 35% to 60% of the weight of the total mixture, and more desirably, about 41%. In these proportions, there is an excess quantity present over and above the stoichiometric amount required for reaction. This excess is believed to be desirable although not absolutely essential since reducing the excess still yields workable compounding compositions. Although various grades of zinc oxide may be used, a coated variety, e.g. one coated preferably with propionic acid or derivatives thereof is used; such material being supplied by St. Joseph's Lead Co., Monaca, Pa., under their designation 42–21.

The sulfur component may be ordinary "tire brand" sulfur and is preferably present in amounts from 28% to 34%, and more desirably about 32%, by weight of the total mixture.

In general, the fatty acid component may be selected from a wide assortment of mixtures with differing melting points and comprising varying proportions of saturated and unsaturated fatty acid molecules, e.g. from 10 carbon atoms to 20 carbon atoms, including fatty acids such as lauric, myristic, palmitic, stearic, oleic, linoleic acids. The preferred material, designated as rubber grade stearic acid, has a generally lower melting point than 100% stearic acid and offers economic advantages over the same. The rubber grade stearic acid contains about 58% stearic acid, 25% palmitic acid, with minor amounts of myristic and linoleic acids present therein. Other fatty acid mixtures having differing proportions of stearic acid ratios may also be used. As added to the high intensity mixer, the most preferred proportion of rubber grade stearic acid used is approximately 16% by weight of the totally added components. As produced, the premixed composition will preferably contain approximately 16% zinc oxide-fatty acid reaction product, reportable as zinc stearate, but may vary from about 5% to 20%, depending on the proportions used, mixing and reaction time, temperature of the ingredients, etc.

The accelerators useful in the practice of the present invention may be selected from a wide range of organic materials, each of which behaves somewhat differently in performing their function, such, that some degree of variance in curing time required for vulcanization may be expected. Illustrative examples of accelerators which may be useful in the practice of this invention include aryl-substituted guanadines such as diphenyl guanadine, di-tolyl guanadine, aldehyde-amine condensation products, dithiolcarbamates such as zinc dibutyldithiocarbamate and lead dimethyldithiocarbamate, thiuram sulfides such as tetramethyl thiuram disulfide, tetramethyl thiuram monosulfide, dipentamethylene-thiuram tetrasulfide, thio-azoles such as 2-mercaptobenzothiazole, zinc benzothiozyl sulfide, benzothiazyl disulfide, sulfenimides, such as benzothiazylsulfenamide including the diethyl, butyl, octyl, cyclohexyl, and dimethyl substituted versions thereof.

The preferred combinations of accelerators include benzothiazyl disulfide and tetramethyl thiuram monosulfide; butyl-2-benzothiazylsulfenimide and tetramethylthiuram monosulfide; cyclic thiuram and tetramethylthiuram monosulfide; said combinations generally present in weight ratios of from 1:1 to 1:2. Accelerator-activators may also be added, such as urea, or preferably a urea which is surface-coated to minimize dusting. Preferred quantities of such accelerator-activators are from about 0.5% to 2% by weight. If desired, however, the accelerator-activator may be omitted.

Premixed compounding compositions produced in accordance with the present invention are formulated for use with sulfur cured elastomers in general, and with natural or synthetic rubber in particular, by dispersement therein in suitable masticating rolls or Banbury mixers and thereafter vulcanizing the compounded elastomeric material at elevated temperatures, i.e. above 220° F., for periods varying from several minutes to one or more hours. Preferred vulcanizing conditions are those conducted at temperatures of from about 240° F. to 300° F., from 15 to 45 minutes.

As employed herein, the term "elastomer" includes both natural and synthetic rubbers vulcanizable with sulfur. Representative synthetic rubber polymers of this variety are the homopolymerization products of butadiene and derivatives such as butadiene, dimethyl butadiene, pentadiene and chloroprene (neoprene synthetic rubber), as well as butadiene-olefin copolymers, such as butyl rubber, buna rubbers, and butadiene-styrene copolymers or "SBR." As heretofore explained the rubber composition generally used by a tire retread processor is a masterbatch blend of, preferably, butadiene-styrene copolymer latex with substantial quantities of carbon and oil blended therein. It is to be noted that the preferred premixed compounding composition is particularly well adapted to the styrene - butadiene masterbatch material, as illustrated below.

Although the "insitu" process, as heretofore described, is a preferred process, it has been found that compounding composition of the present invention may also be provided by blending already-formed zinc salts of fatty acids, as for example, zinc stearate with suitable quantities of sulfur, accelerators, accelerator-activator, such that, the composition of this blend is substantially identical to the "insitu" product. An appropriate quantity of zinc oxide and fatty acid is therefore eliminated from the alternative process, and is replaced by the equivalent reaction product. The alternate process yields a compounding composition having chemical properties which compare favorably to the premixed composition formed in the "in situ" process, however, it was noted that it was not as resistant to stratification as the "in situ" product.

Having described the basic aspects of the present invention, the following examples are given to illustrate the specific embodiments thereof. In these examples, the parts and percentages are given by weight.

EXAMPLE 1

Approximately 6.9 parts of the composition of the present invention were prepared as follows:

2.8 parts of zinc oxide, 2.2 parts of sulfur, 0.3 parts benzothiazyl disulfide, 0.4 part of tetramethylthiuram monosulfide, and 0.1 part of surface-coated urea were charged into a heated Patterson-Kelley Twin-Shell Mixer with Intensifier Bar (liquid-solid blender) and thoroughly mixed by tumbling for approximately three minutes, at which time the mixed particles were at a temperature of approximately 90° F.

1.1 parts of molten stearic acid at a temperature of between 170° F. and 175° F. were then sprayed into the mixed powder for about three minutes, during which the zinc oxide-stearic acid reaction is effected. Immediately thereafter, additional tumbling proceeded for about one minute at which time the resultant composition was quickly discharged and cooled from a temperature of about 190° F. to room temperature by passing through a water-chilled heat exchanger into a collecting drum.

EXAMPLE 2

To illustrate the synergistic effects obtainable when a premixed composition of the present invention is used in the compounding of uncured rubber masterbatches, experiments were conducted on identical rubber masterbatch materials, using the premixed composition on the one hand and equal quantities of the separately added ingredients on the other. The two different rubber masterbatch materials tested had the following compositions:

|  | 1608 masterbatch | 1808 masterbatch |
|---|---|---|
| Styrene butadiene copolymer | 100 parts | 100 parts. |
| Carbon black | 50 parts | 75 parts. |
| Oil | 12.5 parts | 50 parts. |

Both of the masterbatch rubbers contained 100 parts by weight of rubber copolymer. In all of the tests, 6.9 parts of the premixed composition and 6.9 parts of separately added curing agents were blended with each of the rubbers on a two-roll masticating mill. It should be noted thatt he curing agents which were separately added are in the exact proportion and quantity as the premix composition proir to reaction; that is, 2.8 parts of zinc oxide, 1.1 parts of stearic acid, 2.2 parts of sulfur, 0.3 part of benzothiazyl disulfide, 0.4 part of tetramethyl thiuram monosulfide, 0.1 part of surface-coated urea were used (see Example 1). After the contrasting operations were performed, test specimens were taken from each masterbatch. The specimens were vulcanized and tested under standard conditions with results given in Tables 1 and 2:

The time required for a specimen to reach optimum cure, at 280° F. was as follows:

TABLE 1

| | Ingredients separately added | Present invention (premixed composition) |
|---|---|---|
| 1608 masterbatch | 42.8 minutes | 37.8 minutes. |
| 1808 masterbatch | 36.9 minutes | 27.3 minutes. |

The physical properties of a 1608 masterbatch rubber cured at 280° F., were as follows:

TABLE 2

| | Ingredients separately added | Present invention (premixed composition) |
|---|---|---|
| 25 minute cure: | | |
| Tensile. p.s.i | 3,410 | 3,570 |
| 300% modulus. p.s.i | 880 | 1,140 |
| 40 minute cure: | | |
| Tensile. p.s.i | 3,290 | 3,750 |
| 300% modulus. p.s.i | 1,280 | 1,590 |
| 60 minute cure: | | |
| Tensile. p.s.i | 3,320 | 3,525 |
| 300% modulus. p.s.i | 1,490 | 1,720 |

From the foregoing test results, it will be readily apparent that the premixed composition of the present invention significantly reduces the time required for optimum cure (Table 1) and markedly improves the physical characteristics of the rubber at any curing time (Table 2). A vulcanized rubber article made from a masterbatch material compounded with the premixed composition of this invention was shown to be superior to those vulcanized articles made, using conventional techniques.

What is claimed is:

1. A process for preparing a premixed shelf-stable compounding composition useful for compounding and curing curable elastomers, comprising the steps of, preparing a mixture comprising zinc oxide and a vulcanizing agent; heating said mixture to a temperature of at least about 90° F.; spraying into said mixture a molten fatty acid which is at a temperature of less than about 185° F. so as to form a reaction product between said zinc oxide and said fatty acid; and cooling said reacted composition.

2. A process as stated in claim 1, in which the mixture includes a vulcanization accelerator.

3. A process as stated in claim 1, in which the mixture is heated to a temperature in the range of from about 110° F. to about 140° F. prior to the addition of said molten fatty acid.

4. A process as stated in claim 1, in which the vulcanizing agent is sulfur and the fatty acid comprises stearic acid.

5. A process as stated in claim 4, in which the mixed components comprise by weight from up to about 60% zinc oxide, from about 20% to about 40% sulfur, from about 5% to about 35% stearic acid, and up to about 12% of a vulcanization accelerator.

6. A process as stated in claim 4, in which the temperature of the added molten stearic acid is in the range of from about 165° F. to about 185° F.

7. A process for preparing a premixed shelf-stable compounding composition useful for compounding and curing curable elastomers, comprising the steps of, mixing zinc oxide, sulfur, and a vulcanization accelerator; heating said mixture to a temperature of at least about 90° F., spraying into said mixture under agitation a molten fatty acid comprising stearic acid which is at a temperature of less than about 185° F. so as to form a reaction product between said zinc oxide and said fatty acid comprising zinc stearate; and cooling said reacted composition.

8. A premixed shelf-stable compounding composition useful for compounding and curing curable elastomers, produced in accordance with the process of claim 1.

9. A premixed shelf-stable compounding composition useful for compounding and curing curable elastomers, produced in accordance with the process of claim 4.

10. A premixed shelf-stable compounding composition useful for compounding and curing curable elastomers, produced in accordance with the process of claim 5.

11. A premixed shelf-stable compounding composition useful for compounding and curing curable elastomers, produced in accordance with the process of claim 7.

References Cited
UNITED STATES PATENTS

| 2,108,018 | 2/1938 | Morris | 260—752 X |
| 2,288,194 | 6/1942 | Jones et al. | 260—752 X |
| 2,317,463 | 4/1943 | Jones | 260—752 X |
| 2,871,211 | 1/1959 | Mika | 260—23.7 |

OTHER REFERENCES

Alliger et al., "Vulcanization of Elastomers," pp. 131 and 401 (1964).

DONALD E. CZAJA, Primary Examiner

D. J. BARRACK, Assistant Examiner

U.S. Cl. X.R.

260—23.7 M, 799